US012447749B2

(12) United States Patent
Mizutani et al.

(10) Patent No.: US 12,447,749 B2
(45) Date of Patent: Oct. 21, 2025

(54) INK REFILL CONTAINER

(71) Applicant: SEIKO EPSON CORPORATION, Tokyo (JP)

(72) Inventors: Tadahiro Mizutani, Shiojiri (JP); Yoshihiro Koizumi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 176 days.

(21) Appl. No.: 18/127,064

(22) Filed: Mar. 28, 2023

(65) Prior Publication Data

US 2023/0311523 A1 Oct. 5, 2023

(30) Foreign Application Priority Data

Mar. 29, 2022 (JP) ................................ 2022-053043

(51) Int. Cl.
*B41J 2/175* (2006.01)

(52) U.S. Cl.
CPC ....... *B41J 2/17506* (2013.01); *B41J 2/17596* (2013.01)

(58) Field of Classification Search
CPC ......................... B41J 2/17596; B41J 2/17509; B41J 2/17513; B41J 2/17523; B41J 2/17506; B41J 2/1752; B41J 2/175
See application file for complete search history.

(56) References Cited

U.S. PATENT DOCUMENTS 10,308,029 B2 6/2019 Kudo et al.
10,350,896 B2 7/2019 Ishizawa et al.
10,350,901 B2 7/2019 Mizutani et al.
10,471,723 B2 11/2019 Fukasawa et al.
10,717,287 B2 7/2020 Mizutani et al.
10,752,003 B2 8/2020 Mizutani et al.
10,889,123 B2 1/2021 Mizutani et al.
11,001,068 B2 5/2021 Fukasawa et al.
11,007,787 B2 5/2021 Mizutani et al.
11,117,379 B2 9/2021 Fukasawa et al.
11,179,944 B2 11/2021 Mizutani et al.
2017/0355191 A1 12/2017 Mizutani et al.
2017/0355194 A1 12/2017 Fukasawa et al.
2017/0355195 A1 12/2017 Fukasawa et al.
2017/0355196 A1 12/2017 Shinada et al.
(Continued)

FOREIGN PATENT DOCUMENTS

JP 2018-144281 A 9/2018
JP 6504305 B2 4/2019
JP 2021-070256 A 5/2021

*Primary Examiner* — Jannelle M Lebron
(74) *Attorney, Agent, or Firm* — Oliff PLC

(57) ABSTRACT

An ink refill container includes: a container body portion; an ink-outlet forming portion coupled to the container body portion and including a cylindrical portion having an ink outlet; a sealing member provided in the cylindrical portion and having an opening that enables insertion and removal of an ink introduction conduit; a valve member provided to be configured to come into contact with the sealing member; a spring member configured to urge the valve member toward the sealing member; and a valve holder holding at least the valve member and the spring member, and the valve holder includes an engagement portion configured to detachably engage at least one of the ink-outlet forming portion and the container body portion.

10 Claims, 8 Drawing Sheets

(56) References Cited

U.S. PATENT DOCUMENTS

| | | | | |
|---|---|---|---|---|
| 2017/0355197 | A1 | 12/2017 | Kudo et al. | |
| 2018/0250944 | A1 | 9/2018 | Ishizawa et al. | |
| 2019/0299624 | A1 | 10/2019 | Mizutani et al. | |
| 2019/0299625 | A1 | 10/2019 | Mizutani et al. | |
| 2020/0070523 | A1 | 3/2020 | Fukasawa et al. | |
| 2020/0282730 | A1 | 9/2020 | Mizutani et al. | |
| 2020/0298579 | A1 | 9/2020 | Mizutani et al. | |
| 2021/0023850 | A1 | 1/2021 | Mizutani et al. | |
| 2021/0129552 | A1 | 5/2021 | Maruyama | |
| 2021/0237456 | A1 | 8/2021 | Mizutani et al. | |
| 2021/0261301 | A1* | 8/2021 | Masukawa | B41J 2/17513 |
| 2022/0016893 | A1* | 1/2022 | Nagai | B41J 2/17509 |
| 2022/0032638 | A1 | 2/2022 | Mizutani et al. | |

* cited by examiner

INK REFILL CONTAINER

The present application is based on, and claims priority from JP Application Serial Number 2022-053043, filed Mar. 29, 2022, the disclosure of which is hereby incorporated by reference herein in its entirety.

BACKGROUND

1. Technical Field

The present disclosure relates to techniques for ink refill containers.

2. Related Art

A technique for providing, in an ink refill container for refilling an ink tank with ink, a valve configured to open and close at the outlet through which ink flows out (JP-A-2021-70256 and JP-A-2018-144281) has been known.

In related techniques, there have been some cases in which it is difficult to remove and reuse the valve provided at the ink outlet.

SUMMARY

An aspect of the present disclosure provides an ink refill container. An ink refill container for refilling an ink tank of a printer with ink through an ink introduction conduit communicating with the ink tank, the ink refill container including: a container body portion having an ink storing chamber configured to store ink; an ink-outlet forming portion coupled to the container body portion and including a cylindrical portion having an ink outlet; a sealing member disposed in the cylindrical portion and having an opening that enables insertion and removal of the ink introduction conduit; a valve member provided to be configured to come into contact with the sealing member; a spring member configured to urge the valve member toward the sealing member; and a valve holder configured to hold at least the valve member and the spring member, in which the valve holder includes an engagement portion configured to detachably engage at least one of the ink-outlet forming portion and the container body portion at a position closer to the ink storing chamber than the attachment position of the sealing member in a direction of a center axis of the ink outlet.

DESCRIPTION OF EXEMPLARY EMBODIMENTS

A. First Embodiment

Figure 1:
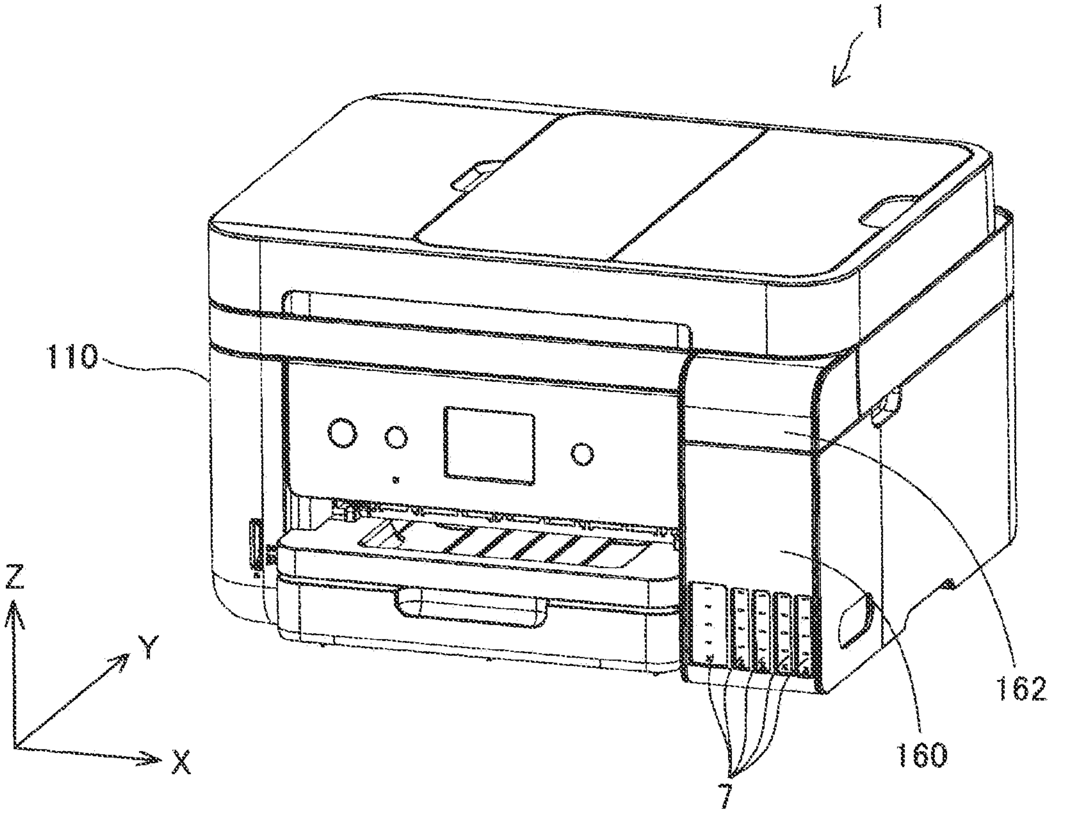
FIG. 1 is a perspective view of a printer of a first embodiment.

FIG. 1 is a perspective view of a printer 1 of a first embodiment. The printer 1 is an ink jet printer which performs printing by ejecting ink onto a print medium. FIG. 1 shows XYZ-axes which are three spatial axes orthogonal to one another. The directions in which the arrows of the X-axis, Y-axis, and Z-axis point are the positive directions along the X-axis, Y-axis, and Z-axis. The positive directions along the X-axis, Y-axis, and Z-axis are defined as the +X direction, +Y direction, and +Z direction, respectively. The directions opposite to the directions in which the arrows of the X-axis, Y-axis, and Z-axis point are the negative directions along the X-axis, Y-axis, and Z-axis, respectively. The negative directions along the X-axis, Y-axis, and Z-axis are defined as the −X direction, −Y direction, and −Z direction, respectively. The direction of the X-axis, Y-axis, or Z-axis which is either positive or negative is referred to as the X direction, Y direction, or Z direction, respectively. In the present embodiment, the X direction is aligned with the width direction, in other words, the longitudinal direction, of the printer 1. The Y direction is aligned with the depth direction, in other words, the lateral direction, of the printer 1. The Z direction is aligned with the height direction of the printer 1. The printer 1 is installed on a horizontal installation surface defined by the X direction and the Y direction.

The printer 1 includes a housing 110. A carriage (not illustrated) movable in the main scanning direction in the X direction is provided in the housing 110. The carriage has an ejecting head (not illustrated) that ejects ink onto a print medium. The housing 110 has an ink-tank storing unit 160. In the example illustrated in FIG. 1, the ink-tank storing unit 160 is located at one end of the front face, located in the −Y direction, of the housing 110. Note that the position at which the ink-tank storing unit 160 is formed in the housing 110 is not limited to this example.

Figure 2:
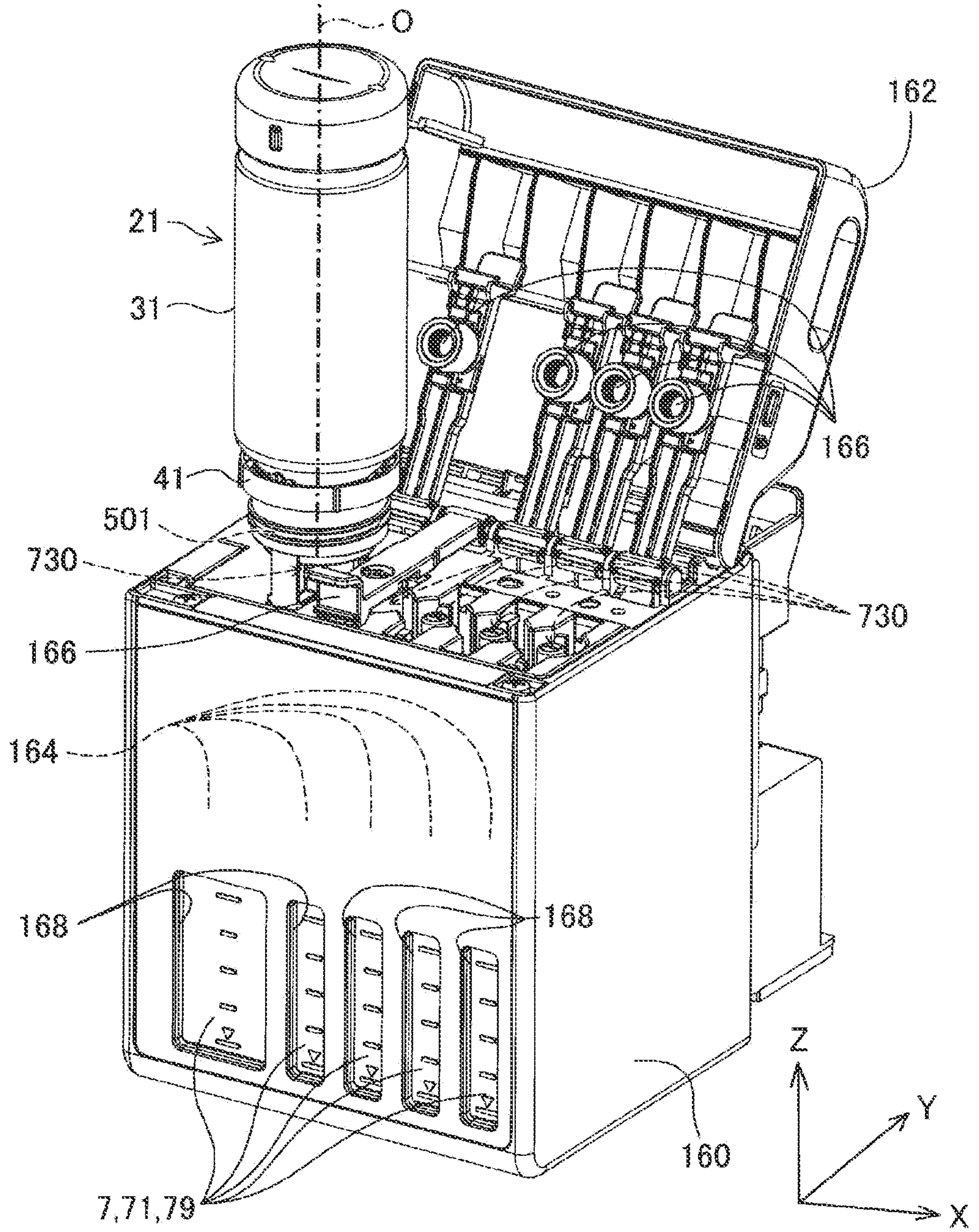
FIG. 2 is a perspective view of an ink refill container and an ink-tank storing unit illustrating their schematic configurations.

FIG. 2 is a perspective view of an ink refill container 21, the ink-tank storing unit 160, and ink tanks 7, illustrating their schematic configurations. FIG. 2 illustrates a refilling state in which the ink refill container 21 is being used to refill an ink tank 7 stored in the ink-tank storing unit 160 with ink. In the refilling state, the ink refill container 21 has an inverted posture. In the following, the ink-tank storing unit 160, the ink tank 7, and the ink refill container 21 are described on the assumption that their orientations are in the refilling state. Specifically, regarding the ink-tank storing unit 160 and the ink tank 7, the −Y direction side is defined as the front side, the +Y direction side as the rear side, the +Z direction side as the upper side, and the −Z direction side as the lower side. The ink refill container 21 is described on the assumption of the inverted orientation in the refilling state. Regarding the ink refill container 21, the −Z direction side which is the side that comes into contact with an inlet flow-path member 73 described later in the refilling state is defined as the distal end side, and the +Z direction side is defined as the proximal end side. The same is true in the figures that follow.

The ink tank 7 stores ink to be supplied to the ejection head. The ink tank 7 is coupled to the ejection head with a tube (not illustrated). In the present embodiment, the ink tank 7 is not mounted on the carriage and is stationary. However, the ink tank 7 may be mounted on the carriage. The ink tank 7 is, for example, substantially box shaped, the width direction of which is the X direction, the depth direction of which is the Y direction, and the height direction of which is the Z direction.

The ink tank 7 has an ink storage chamber 71, the inlet flow-path member 73, a tank-side positioning portion 729, and a visual check portion 79. The ink storage chamber 71 is a space formed inside the ink tank 7 to store ink.

Figure 3:
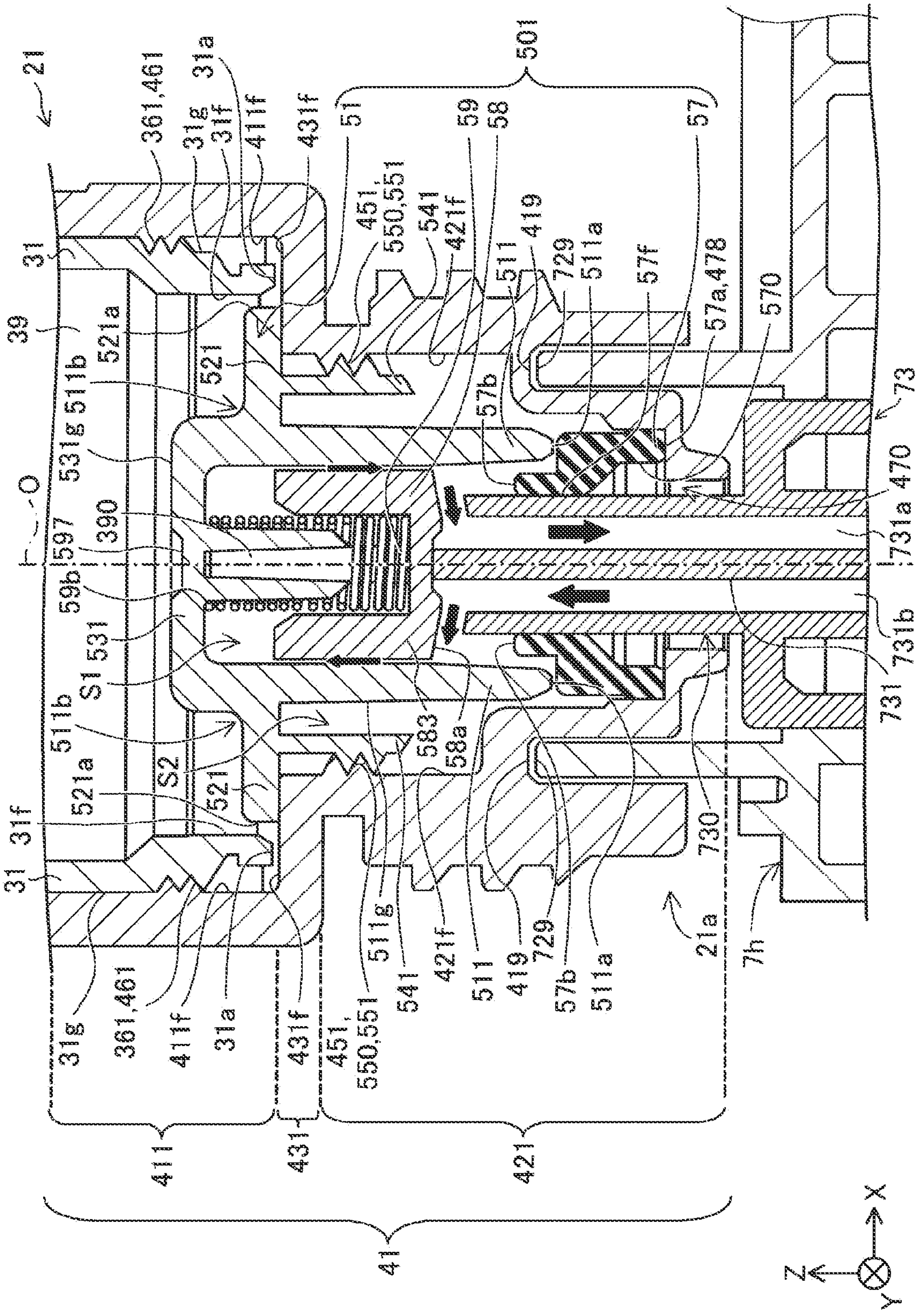
FIG. 3 is an enlarged cross-sectional view of an inlet flow-path member and the peripheral structure in a refilling state.

FIG. 3 is an enlarged cross-sectional view of the inlet flow-path member 73 and the peripheral structures in the refilling state. FIG. 3 illustrates a cross-sectional view of the coupling portion between the ink refill container 21 and the inlet flow-path member 73 taken along the XZ plane including the center axis O. Here, the center axis O is the center axis of an ink outlet 470 of the ink refill container 21. In the refilling state, the center axis O of the ink refill container 21 is aligned with the center axis of the inlet flow-path member 73. Thus, the center axis O is also the center axis of the inlet flow-path member 73.

The inlet flow-path member 73 is a cylindrical-shaped member provided for refilling the ink tank 7 with ink. As illustrated in FIG. 2, the inlet flow-path member 73 is located on the upper side of the ink tank 7 such that at least part of the inlet flow-path member 73 is exposed when a lid 162 described later is open. As illustrated in FIG. 3, the inlet flow-path member 73 contains an ink introduction conduit 730 communicating with the ink storage chamber 71. The ink introduction conduit 730 includes at least an inlet-conduit-side ink flow path 731*a* that enables the ink storage chamber 71 to be supplied with ink. In the present embodiment, the ink introduction conduit 730 includes, in addition to the above inlet-conduit-side ink flow path 731*a*, an air flow path 731*b* for discharging air from the ink storage chamber 71 to the ink refill container 21. The inlet-conduit-side ink flow path 731*a* and the air flow path 731*b* are located in the ink introduction conduit 730 and separated by a partition wall 731 extending in the direction of the center axis O. In the present embodiment, refilling the ink tank 7 with ink from the ink refill container 21 utilizes liquid-gas exchange. Note that the method of ink refilling is not limited to this method.

In the refilling state, the tank-side positioning portion 729 is fitted with a container-side positioning portion 419 described later. The tank-side positioning portion 729 protrudes from a tank upper face 7*h*, which is an upper-side face of the ink tank 7, toward the ink refill container 21. In the present embodiment, the tank-side positioning portion 729 is formed in the circumference direction centered on the center axis O. Note that the tank-side positioning portion 729 has only to be configured to fit the container-side positioning portion 419, and the shape and position of the tank-side positioning portion 729 are not limited to this configuration.

As illustrated in FIG. 2, the visual check portion 79 is the front face of the ink tank 7. The visual check portion 79 is made of a transparent resin so that the amount of remaining ink stored in the ink storage chamber 71 can be visually checked. The visual check portion 79 has a plurality of graduations to make it easy to visually check the position of the liquid surface of the ink stored in the ink storage chamber 71 and a lower limit mark for indicating the lower limit value of the amount of remaining ink. When the liquid surface of the ink falls below the lower limit mark, in other words, when the amount of remaining ink becomes smaller than a predetermined criterion, ink is added by using the ink refill container 21. Note that the configurations of the ink tank 7 and the constituents 71, 73, and 79 of the ink tank 7 are not limited to the above examples.

The ink-tank storing unit 160 stores a plurality of ink tanks 7. In the present embodiment, the ink-tank storing unit 160 stores five ink tanks 7. The ink-tank storing unit 160 includes storage spaces 164, the lid 162, sealing caps 166, and exposure portions 168.

The storage space 164 is a space in a bottomed shape formed inside the ink-tank storing unit 160 to store the ink tank 7. The number of the storage spaces 164 provided inside the ink-tank storing unit 160 is the same as that of the ink tanks 7 to be stored.

The lid 162 is located at an upper portion of the ink-tank storing unit 160 and configured to open and close. For example, when the amount of remaining ink falls below the lower limit mark, the front side of the lid 162 illustrated in FIG. 1 is pushed upward, and the lid 162 is opened as illustrated in FIG. 2. With this operation, the inlet flow-path members 73 communicating with the ink tanks 7 are exposed.

The sealing cap 166 is a member to seal the distal end of the inlet flow-path member 73 in the non-refilling state in which the ink tank 7 is not being refilled with ink. To refill the ink tank 7 with ink, the sealing cap 166 is removed from the inlet flow-path member 73 to expose the upper portion of the inlet flow-path member 73. In this state, the ink refill container 21 and the inlet flow-path member 73 can be coupled, and the ink tank 7 can be refilled with the ink in the ink refill container 21. Note that "ink refilling" denotes an action of refilling the ink tank 7 with ink to increase the amount of remaining ink. In this operation, ink refilling does not have to completely fill the ink tank 7 with ink. In addition, "ink refilling" includes an action of charging an empty ink tank 7 with ink for the initial use of the printer 1.

The exposure portion 168 is an opening formed to enable the visual check portion 79 to be visually checked from the outside in the state in which the ink tank 7 is stored in the ink-tank storing unit 160. The exposure portion 168 is located at a position that matches the position of the visual check portion 79 when the ink tank 7 is stored. In the example illustrated in FIG. 2, the exposure portions 168 are located at a lower portion of the front face of the ink-tank storing unit 160. Note that the exposure portion 168 has only to enable the visual check portion 79 to be visually checked from the outside when the ink tank 7 is stored, and hence, for example, the exposure portion 168 may be made of a transparent resin instead of having the opening. The method of checking the amount of remaining ink is not limited to this configuration.

The ink refill container 21 refills the ink tank 7 with ink through the ink introduction conduit 730 communicating with the ink tank 7 of the printer 1. In the present embodiment, the ink refill container 21 is substantially cylindrically shaped and centered on the center axis O. The ink refill container 21 includes a container body portion 31, an ink-outlet forming portion 41, and a valve unit 501.

Figure 4:
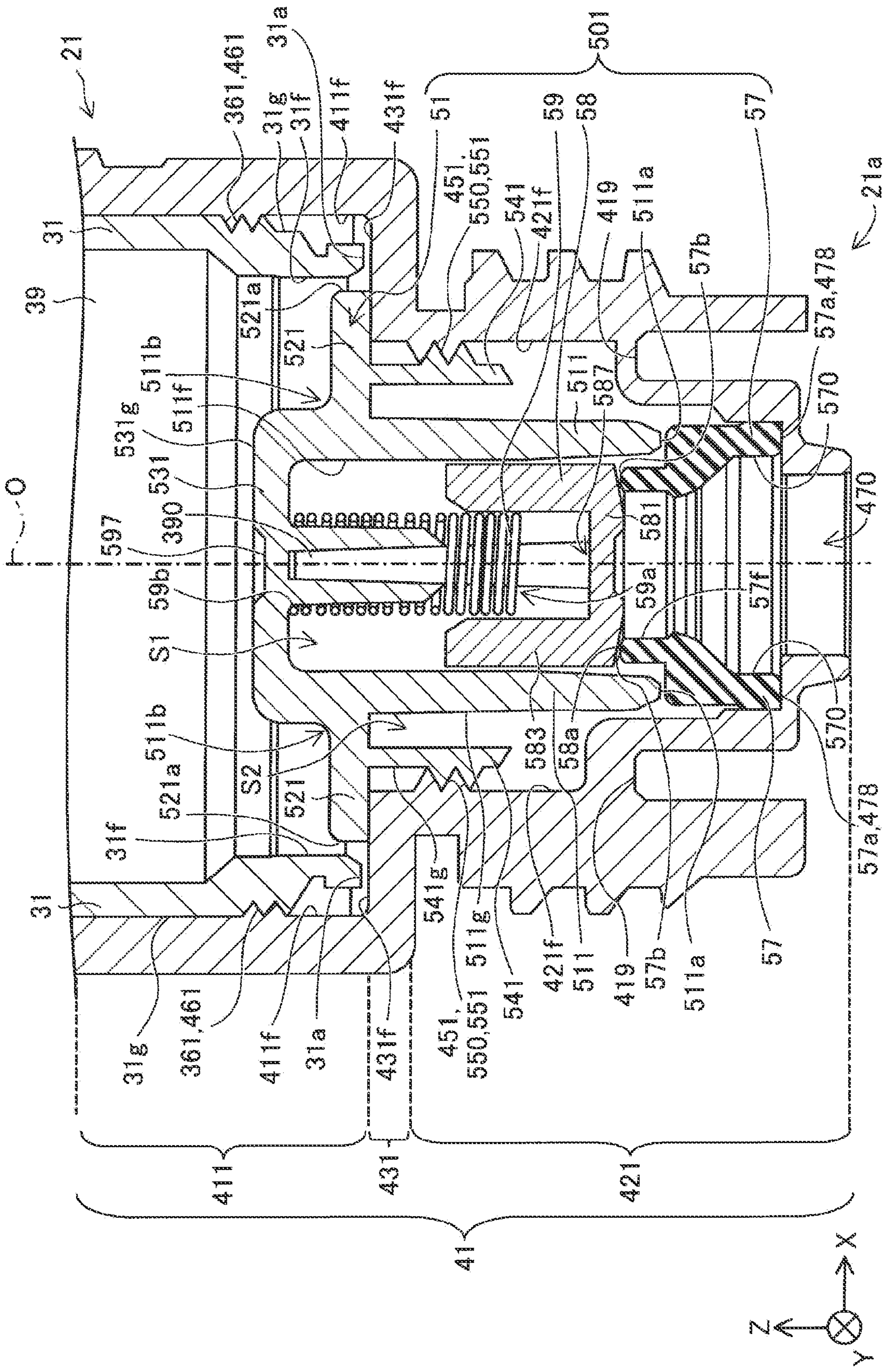
FIG. 4 is a cross-sectional view of an ink-outlet forming portion and a valve unit in a non-refilling state.

FIG. 4 is an enlarged cross-sectional view of the ink-outlet forming portion 41 and the valve unit 501 illustrating the detailed configurations in the non-refilling state. FIG. 4 illustrates a cross-sectional view of the ink-outlet forming portion 41 and the valve unit 501 taken along the XZ plane including the center axis O. FIG. 4 also illustrates part of the container body portion 31 to explain the positional relationship and the coupling method between the container body portion 31 and the ink-outlet forming portion 41.

The container body portion 31 is configured to store ink. In the present embodiment, as illustrated in FIGS. 2 and 4, the container body portion 31 has a bottomed cylindrical shape centered on the center axis O in which a container distal-end portion 31*a* on the −Z direction side is open, and the side opposite to the container distal-end portion 31*a* is the bottom face. As illustrated in FIG. 4, the container body portion 31 includes an ink storing chamber 39 that stores ink, a container-side ink flow path 390, and a container-side coupling portion 361 serving as a coupling portion configured to be coupled by thread engagement. The container-side ink flow path 390 enables the ink stored in the ink storing chamber 39 to flow out. The container-side ink flow path 390 communicates with the ink storing chamber 39 and extends along the center axis O in the −Z direction from the ink storing chamber 39 of the container body portion 31 toward the ink outlet 470. The container-side coupling portion 361 is coupled to an outlet-forming-portion-side coupling portion 461 described later. In the present embodiment, the container-side coupling portion 361 is formed on the outer surface 31*g* of the container body portion 31 at a position close to the container distal-end portion 31*a*. The container-side coupling portion 361 is a thread groove for receiving the outlet-forming-portion-side coupling portion 461. In other words, the container-side coupling portion 361 is an external thread formed by thread-cutting the outer surface 31*g* of the container body portion 31.

The ink-outlet forming portion 41 is a member of the ink refill container 21 configured to be coupled to a portion of the container body portion 31 close to the container distal-end portion 31*a* which is on the −Z direction side. The ink-outlet forming portion 41 functions as a so-called spout. The ink-outlet forming portion 41 includes a coupling portion 411, a cylindrical portion 421, and a step portion 431. The coupling portion 411, the cylindrical portion 421, and the step portion 431 have an integrated structure. Both the coupling portion 411 and the cylindrical portion 421 have cylindrical shapes centered on the center axis O and extending in the Z direction of the center axis O. In the present embodiment, the diameter of the coupling portion 411 is larger than the diameter of the cylindrical portion 421 in radial directions centered on the center axis O. Note that the radial directions centered on the center axis O extend in the X direction.

The coupling portion 411 is a portion of the ink-outlet forming portion 41 on the +Z direction side, which is a portion close to the ink storing chamber 39 of the container body portion 31. The coupling portion 411 houses part of the valve unit 501 and part of the container body portion 31. The coupling portion 411 has the outlet-forming-portion-side coupling portion 461 which is a coupling portion configured to be coupled to the container-side coupling portion 361 by thread engagement. The outlet-forming-portion-side coupling portion 461 is coupled to the container-side coupling portion 361. In the present embodiment, the diameter of the coupling portion 411 is larger than the diameter of the container body portion 31, and thus, the outlet-forming-portion-side coupling portion 461 is formed on the inner surface 411*f* of the coupling portion 411. The outlet-forming-portion-side coupling portion 461 is a thread ridge that fits the container-side coupling portion 361. In other words, the outlet-forming-portion-side coupling portion 461 is an internal thread portion formed by thread-cutting the inner surface 411*f* of the coupling portion 411.

The container-side coupling portion 361 and the outlet-forming-portion-side coupling portion 461 are coupled by thread engagement by rotating at least one of the container body portion 31 and the ink-outlet forming portion 41 in the circumferential direction centered on the center axis O. With this operation, the container body portion 31 and the ink-outlet forming portion 41 are coupled. Note that the coupling position and coupling method of the container body portion 31 and the ink-outlet forming portion 41 are not limited to this configuration. In the process of coupling the container body portion 31 and the ink-outlet forming portion 41, for example, after engagement is made by the thread engagement as described above, the coupling strength may be increased by using a ratchet mechanism.

The cylindrical portion 421 is a portion of the ink-outlet forming portion 41 on the −Z direction side, which is a portion further from the container body portion 31 than the coupling portion 411. In other words, the cylindrical portion 421 is a portion close to the distal end portion 21*a* of the ink refill container 21. The cylindrical portion 421 houses the valve unit 501. The cylindrical portion 421 includes the ink outlet 470, a support portion 478, a container-side engagement portion 451, and the container-side positioning portion 419.

As illustrated in FIG. 3, the ink outlet 470 is configured to receive the ink introduction conduit 730 of the ink tank 7. The support portion 478 supports a sealing member 57 described later. Specifically, a seal distal end portion 57*a* which is the end portion of the sealing member 57 in −Z direction is mounted on the support portion 478. Thus, the support portion 478 supports the sealing member 57 from the −Z direction side.

The container-side engagement portion 451 is an engagement mechanism for attaching and detaching a valve holder 51. The container-side engagement portion 451 is formed on the inner surface 421*f* of the cylindrical portion 421 at a position closer to the ink storing chamber 39 of the container body portion 31 than the position at which the container-side positioning portion 419 is formed. The container-side engagement portion 451 engages a valve-side engagement portion 550 described later. In the present embodiment, the container-side engagement portion 451 is a thread ridge that engages a thread portion 551 which is the valve-side engagement portion 550. In other words, the container-side engagement portion 451 is an internal thread portion formed by thread-cutting the inner surface 411*f* of the cylindrical portion 421. The container-side engagement portion 451 is formed in a spiral shape in the circumferential direction centered on the center axis O.

The container-side positioning portion 419 fits the tank-side positioning portion 729 in the refilling state. The container-side positioning portion 419 is a recess that is located on the −Z direction side of the cylindrical portion 421, where the ink outlet 470 is formed, and on the outside of the ink outlet 470 in the radial direction, and that is recessed in the direction from the ink outlet 470 toward the ink storing chamber 39 of the container body portion 31. In the present embodiment, the container-side positioning portion 419 is formed in the circumferential direction centered on the center axis O. Note that the container-side positioning portion 419 is not an essential constituent in the ink refill container 21.

The step portion 431 connects the coupling portion 411 and the cylindrical portion 421. The step portion 431 has an annulus shape extending in the circumferential direction centered on the center axis O in the XY plane orthogonal to the Z direction, which is the direction in which the center axis O extends. The inner surface 431*f* of the step portion 431 faces the container distal-end portion 31*a*. A radially outer part of the bottom portion 521 of the valve holder 51 is mounted on a radially inner part of the step portion 431.

The valve unit 501 is a valve mechanism that opens a valve in the refilling state and closes the valve in the non-refilling state. In the following, the refilling state is also referred to as "valve open state", and the non-refilling state is also referred to as "valve closed state". The valve unit 501 includes the sealing member 57, a valve member 58, a spring member 59, and the valve holder 51. The sealing member 57, the valve member 58, and the spring member 59 are located on the inside of the ink-outlet forming portion 41 in this order in the +Z direction, which is the direction from the ink outlet 470 toward the ink storing chamber 39 of the container body portion 31.

The sealing member 57 is for preventing inadvertent ink leakage. Here, "inadvertent ink leakage" denotes leakage, from the ink outlet 470, of ink stored in the ink storing chamber 39 in the non-refilling state, as illustrated in FIG. 4. In the refilling state, inadvertent ink leakage entails leakage of ink at portions other than the ink flow paths 390 and 731 through which ink is supposed to flow from the ink storing chamber 39 to the ink introduction conduit 730 as illustrated in FIG. 4. The sealing member 57 is provided in the cylindrical portion 421. The sealing member 57 is formed in the circumferential direction centered on the center axis O. The sealing member 57 is made of, for example, rubber.

The sealing member 57 has an opening 570 that enables insertion and removal of the ink introduction conduit 730 as illustrated in FIG. 3. The opening 570 is substantially ring shaped and centered on the center axis O. In the valve open state illustrated in FIG. 3, when the ink introduction conduit 730 is inserted into the ink outlet 470, the ink introduction conduit 730 fits into the opening 570 formed in the sealing member 57. In this operation, the valve member 58 is pushed by the ink introduction conduit 730 and moves away from the sealing member 57. In this way, the ink tank 7 is refilled with ink from the ink refill container 21 through the ink introduction conduit 730. In contrast, in the valve closed state illustrated in FIG. 4, the valve-member distal-end portion 58*a* and the seal proximal-end portion 57*b* are substantially in contact with each other. This configuration enables the sealing member 57 to form a seal to prevent the ink stored in the ink storing chamber 39 from leaking through the ink outlet 470.

The valve member 58 is configured to move in accordance with the movement of the spring member 59. The valve open state and the valve closed state are switched by changing the position of the valve member 58. The valve member 58 is provided to be configured to come into contact with the sealing member 57 at the valve-member distal-end portion 58*a*. The valve member 58 includes a contact portion 581 and a spring housing portion 583. The contact portion 581 is a portion closer to the seal proximal-end portion 57*b* than the spring housing portion 583. In the valve open state illustrated in FIG. 3, the contact portion 581 comes into contact with the partition wall 731 of the ink introduction conduit 730. The distal end in the +Z direction of the side wall of the ink introduction conduit 730 is lower than the distal end of the partition wall 731; in other words, the distal end in the +Z direction of the side wall of the ink introduction conduit 730 is located in the −Z direction relative to the distal end of the partition wall 731. With this configuration, when the partition wall 731 comes into contact with the contact portion 581, gaps are formed between the distal end of the side wall of the ink introduction conduit 730 and the contact portion 581. As illustrated in FIG. 4 and other figures, the valve member 58 and/or the valve holder 51 has a through hole 587 passing through the side wall in a radial direction (the −Y direction in FIG. 4). Thus, the inlet-conduit-side ink flow path 731*a* and the air flow path 731*b* communicate with the internal space of the valve member 58, the internal space of the valve holder 51, and the container-side ink flow path 390, through gaps between the distal end of the side wall of the ink introduction conduit 730 and the contact portion 581 and gaps between the valve member 58 and the valve holder 51. The spring housing portion 583 has a cylindrical shape centered on the center axis O. The spring housing portion 583 is formed integrally with the contact portion 581 and extends from the contact portion 581 in the +Z direction in which the container body portion 31 is located. Part of the spring member 59 is housed in the space inside the cylindrical shape of the spring housing portion 583. In other words, the valve member 58 has a bottomed cylindrical shape having the contact portion 581 as the bottom face and the spring housing portion 583 as the side face. Note that the shape of the valve member 58 is not limited to this configuration.

The spring member 59 moves the valve member 58 by expanding and contracting in the direction of the center axis O. The spring distal end portion 59*a* of the spring member 59 is located on the contact portion 581 side of the valve member 58. In the valve closed state illustrated in FIG. 4, the spring member 59 urges the valve member 58 along the center axis O in the urging direction from the ink storing chamber 39 of the container body portion 31 toward the ink outlet 470. In the present embodiment, the urging direction is aligned with the −Z direction. In the valve open state illustrated in FIG. 3, the ink introduction conduit 730 inserted through the ink outlet 470 pushes the valve member 58 in the push direction which is opposite to the urging direction. In the present embodiment, the push direction is aligned with the +Z direction. With this operation, the spring member 59 contracts so that the valve member 58 can move in the push direction. With this operation, flow of ink and flow of air can be established as indicated by the arrows in FIG. 3.

The valve holder 51 holds at least the valve member 58 and the spring member 59. The valve holder 51 includes a holding portion 511 that holds at least the valve member 58 and the spring member 59, the bottom portion 521 configured to come into contact with part of the step portion 431, and a protruding portion 531 that protrudes from the bottom portion 521. The valve holder 51 further includes the valve-side engagement portion 550 and a first engagement support portion 541 on which the valve-side engagement portion 550 is formed. The holding portion 511, the bottom portion 521, the protruding portion 531, the first engagement support portion 541, and the valve-side engagement portion 550 have an integrated structure.

The holding portion 511 has a first space S1 formed inside and holds at least the valve member 58 and the spring member 59 in the first space S1. A holding distal-end portion 511*a* of the holding portion 511 on the ink outlet 470 side is located on the seal proximal-end portion 57*b* side of the sealing member 57. A holding proximal-end portion 511*b* of the holding portion 511 which is opposite from the holding distal-end portion 511*a* is connected to the bottom portion 521 and the protruding portion 531. In the present embodiment, the holding portion 511 has a cylindrical shape centered on the center axis O.

The bottom portion 521 protrudes from the holding proximal-end portion 511*b* toward the container distal-end portion 31*a*. The bottom portion 521 has an annulus shape formed in the circumferential direction centered on the center axis O. In an attachment state in which the valve holder 51 is attached to the ink-outlet forming portion 41, the bottom portion 521 of the valve unit 501 is in contact with part of the inner surface 431*f* of the step portion 431. A bottom-portion distal-end portion 521*a* of the bottom portion 521 which is the radially outer end portion is located near, but not in contact with, the container distal-end portion 31*a* of the container body portion 31.

The protruding portion 531 is a portion to be held, for example, when the valve holder 51 is removed from the ink-outlet forming portion 41. The protruding portion 531 protrudes in the direction of the center axis O from the ink outlet 470 toward the ink storing chamber 39, in other words, in the +Z direction, and forms an outer surface 531*g* which is the side opposite from the side holding the spring member 59. Specifically, the protruding portion 531 is a portion of the bottom portion 521 that protrudes from the holding proximal-end portion 511*b* in the +Z direction toward the ink storing chamber 39. Here, "side holding the spring member 59" denotes the first space S1 side holding the valve member 58 and the spring member 59, in other words, the side connected to the inner surface 511*f* of the holding portion 511. The spring proximal-end portion 59*b* of the spring member 59 is attached to the first space S1 side of the protruding portion 531. The protruding portion 531 also has a holder-side through hole 597 that the container-side ink flow path 390 passes through. Note that the holder-side through hole 597 may be near or away from the center axis O in a radial direction.

The first engagement support portion 541 is located on the inside of the ink-outlet forming portion 41 in the radial direction and protrudes in the direction of the center axis O from the bottom portion 521 toward the ink outlet 470, specifically, in the −Z direction. In the present embodiment, the first engagement support portion 541 is substantially cylindrically shaped and centered on the center axis O. The first engagement support portion 541 is apart from the holding portion 511 and surrounds at least part of the holding portion 511 on the outside of the holding portion 511 in the radial direction. The first engagement support portion 541 is located on the inside of the cylindrical portion 421 in the radial direction. In other words, the first engagement support portion 541 is apart from the inner surface 421*f* of the cylindrical portion 421 and extends in the −Z direction along the inner surface 421*f* of the cylindrical portion 421.

The valve-side engagement portion 550 is an engagement mechanism configured to detachably engage at least one of the ink-outlet forming portion 41 and the container body portion 31 at a position closer to the ink storing chamber 39 of the container body portion 31 than the attachment position of the sealing member 57 in the direction of the center axis O of the ink outlet 470. In the present embodiment, the valve-side engagement portion 550 detachably engages the ink-outlet forming portion 41. The valve-side engagement portion 550 is the thread portion 551 formed on the outer surface 541*g* of the first engagement support portion 541 and is configured to be engaged by thread engagement. Hence, the thread portion 551 is a thread groove that engages the container-side engagement portion 451 which is a thread ridge. In other words, the thread portion 551 is an external thread portion formed by thread-cutting the outer surface 541*g* of the first engagement support portion 541. The thread portion 551 is formed in a spiral shape in the circumferential direction centered on the center axis O.

The valve holder 51, holding at least the valve member 58 and the spring member 59, is attached to the ink-outlet forming portion 41, for example, before the ink-outlet forming portion 41 is coupled to the container body portion 31. To attach the valve holder 51 to the ink-outlet forming portion 41, for example, the valve holder 51 is placed in the ink-outlet forming portion 41 such that the protruding portion 531 is positioned on the coupling portion 411 side, and such that the holding portion 511 is positioned on the cylindrical portion 421 side. Then, the protruding portion 531 of the valve holder 51 is held, and the valve holder 51 is rotated in the circumferential direction centered on the center axis O. With this operation, the thread portion 551, which is the valve-side engagement portion 550, engages the container-side engagement portion 451, and the valve holder 51 is attached to the ink-outlet forming portion 41. Then, the outlet-forming-portion-side coupling portion 461 of the ink-outlet forming portion 41 is coupled to the container-side coupling portion 361 of the container body portion 31, thereby forming the ink refill container 21.

To remove the valve holder 51 from the ink-outlet forming portion 41, for example, the protruding portion 531 of the valve holder 51 is held while the valve holder 51 is rotated in the circumferential direction centered on the center axis O opposite to the direction at the time of attaching. With this operation, the thread portion 551 and the container-side engagement portion 451 are disengaged, and the valve holder 51 is removed from the ink-outlet forming portion 41.

In the above first embodiment, as illustrated in FIG. 4, the ink-outlet forming portion 41 has the container-side engagement portion 451, and the valve holder 51 has the valve-side engagement portion 550 configured to engage the container-side engagement portion 451. With this configuration, it is possible to attach the valve holder 51 to the ink-outlet forming portion 41 by engaging the valve-side engagement portion 550 with the container-side engagement portion 451. In addition, it is possible to remove the valve holder 51 from the ink-outlet forming portion 41 by disengaging the valve-side engagement portion 550 from the container-side engagement portion 451. In short, it is possible to detachably attach the valve holder 51 to the ink-outlet forming portion 41. This configuration makes it possible to remove the valve holder 51 which is attached to the ink-outlet forming portion 41. In this state, the valve holder 51 holds the valve member 58 and the spring member 59. Thus, the valve member 58 and the spring member 59 can be attached to or removed from the ink-outlet forming portion 41 together with the valve holder 51 by attaching or removing the valve holder 51. Hence, for example, the valve unit 501 can be reused by removing the valve unit 501 from the ink-outlet forming portion 41 of a used ink refill container 21 and cleaning the valve unit 501.

In the above first embodiment, the valve holder 51 can be detachably attached to the ink-outlet forming portion 41. With this configuration, the valve unit 501 can be easily attached to the ink-outlet forming portion 41 in the production process of the ink refill container 21.

In the above first embodiment, it is possible to easily remove the valve holder 51, which is attached to the ink-outlet forming portion 41, and the valve member 58 and spring member 59 held by the valve holder 51. This configuration makes it possible to clean the container body portion 31 and the ink-outlet forming portion 41 with the valve holder 51, the valve member 58, and the spring member 59 removed. Thus, it is easy to clean the container body portion 31 and the ink-outlet forming portion 41. Hence, it is easy to reuse the ink refill container 21 that needs cleaning.

In the above first embodiment, as illustrated in FIG. 3, the larger inner diameter the opening 570 of the sealing member 57 has, the larger outer diameter the ink introduction conduit 730 can have, and the larger outer diameter the ink introduction conduit 730 has, the larger inner diameter the ink introduction conduit 730 can have. Specifically, the inlet-conduit-side ink flow path 731*a* and the air flow path 731*b* can have larger inner diameters. The larger inner diameter the ink introduction conduit 730 has, the larger amount of ink can be supplied per unit time at a predetermined speed, and this shortens the time necessary for ink refilling. In light of this, in the above first embodiment, the valve-side engagement portion 550 is located at a position closer to the ink storing chamber 39 of the container body portion 31 than the attachment position of the sealing member 57 in the direction of the center axis O. In this configuration, since the valve-side engagement portion 550 is not present on the sealing member 57 side, it is possible to avoid the situation in which the inner diameter of the opening 570 of the sealing member 57 is small. Thus, it is easy to enlarge the opening 570 of the sealing member 57 in the radially outward directions.

In the above first embodiment, the valve-side engagement portion 550 is the thread portion 551 configured to come in thread engagement with the container-side engagement portion 451. With this configuration, it is possible to easily attach or detach the valve holder 51 and the valve member 58 and spring member 59 held by the valve holder 51 to or from the ink-outlet forming portion 41 by rotating the valve holder 51.

In the above first embodiment, the valve holder 51 has the protruding portion 531 located on the side opposite from the side holding the spring member 59 and protruding in the direction of the center axis O from the ink outlet 470 toward the ink storing chamber 39 of the container body portion 31. With this configuration, by holding the protruding portion 531, it is possible to easily engage or disengage the valve holder 51 to or from the ink-outlet forming portion 41.

In the above first embodiment, the ink-outlet forming portion 41 and the container body portion 31 are coupled by thread engagement between the outlet-forming-portion-side coupling portion 461 and the container-side coupling portion 361. Thus, since the ink-outlet forming portion 41 is not welded to the container body portion 31, it is possible to easily remove the ink-outlet forming portion 41 from the container body portion 31.

In the above first embodiment, the outer surface 511*g* of the holding portion 511 of the valve holder 51 is radially apart from the inner surface 421*f* of the cylindrical portion 421 of the ink-outlet forming portion 41. Thus, it is possible to form the first engagement support portion 541 having the valve-side engagement portion 550 by utilizing the second space S2 formed between the outer surface 511*g* of the holding portion 511 and the inner surface 421*f* of the cylindrical portion 421.

B. Second Embodiment

Figure 5:
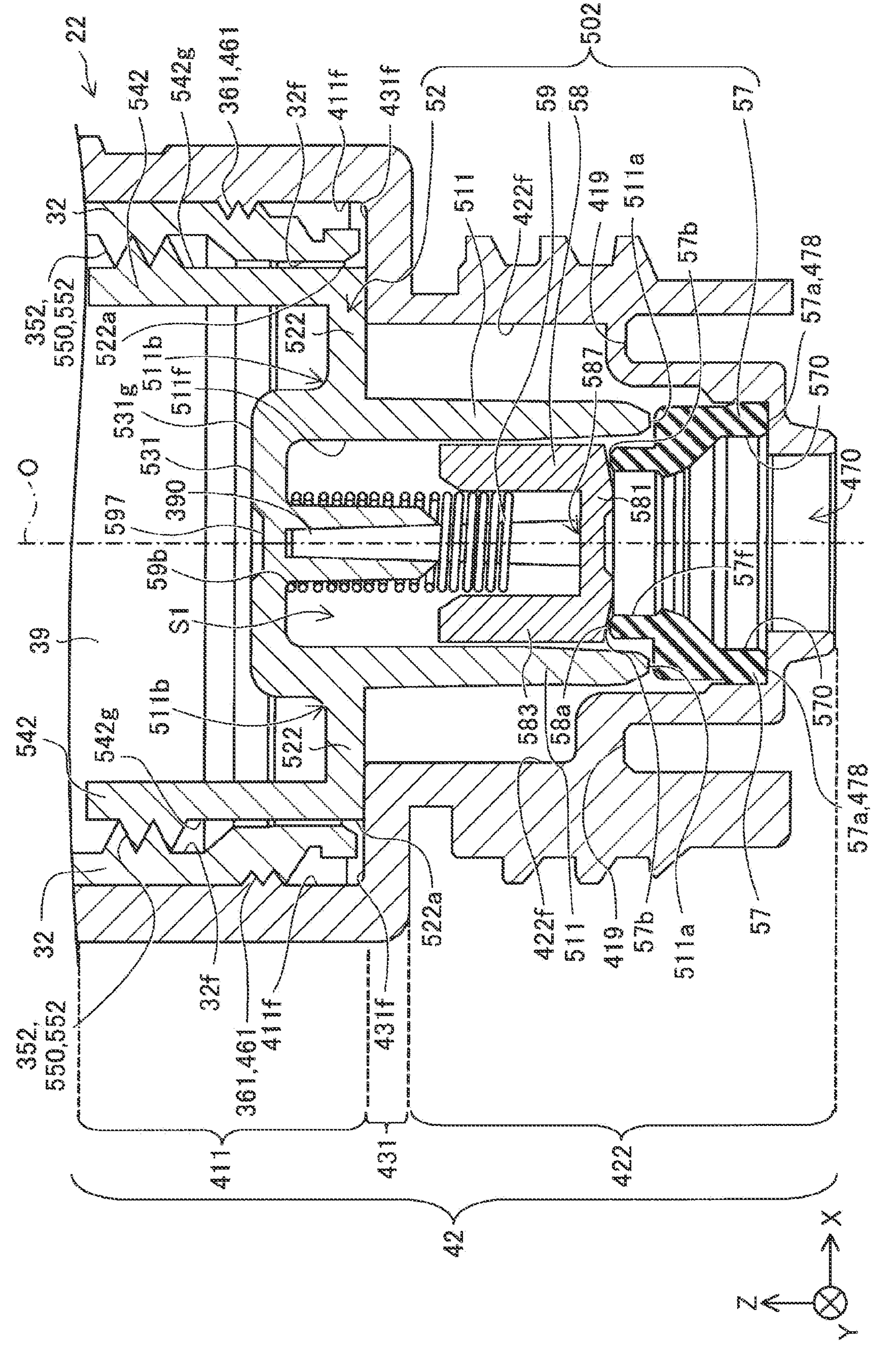
FIG. 5 is an enlarged cross-sectional view of an ink refill container of a second embodiment illustrating the schematic configuration.

FIG. 5 is an enlarged cross-sectional view of an ink refill container 22 of a second embodiment illustrating its schematic configuration. As in FIG. 4, FIG. 5 illustrates a cross-sectional view of part of a container body portion 32, an ink-outlet forming portion 42, and a valve unit 502 taken along the XZ plane including the center axis O. In the present embodiment, the position where a valve holder 52 is engaged with the ink refill container 22 differs from that in the first embodiment. Specifically, the configuration of an engagement support portion 542 of the valve holder 52 and the positions at which a container-side engagement portion 352 and a valve-side engagement portion 550 are formed differ from those in the first embodiment. The other configurations are the same as those in the first embodiment illustrated in FIGS. 1 to 4. The constituents the same as those in the first embodiment are denoted by the same reference numerals, and description thereof is omitted.

The container-side engagement portion 352 is formed on the inner surface 32*f* of a container body portion 32. In other words, in the present embodiment, the container-side engagement portion 352 is not formed on the inner surface 422*f* of a cylindrical portion 422 of the ink-outlet forming portion 42. The container-side engagement portion 352 is a thread ridge that engages a thread portion 552 which is the valve-side engagement portion 550. In other words, the container-side engagement portion 352 is an internal thread portion formed by thread-cutting the inner surface 32*f* of the container body portion 32. The container-side engagement portion 352 is formed in a spiral shape in the circumferential direction centered on the center axis O.

The bottom-portion distal-end portion 522*a* of a bottom portion 522 is located further outside in the radial direction, compared with the bottom-portion distal-end portion 521*a* in the first embodiment illustrated in FIG. 4. In other words, the outer diameter of the bottom portion 522 in the present embodiment is larger than the outer diameter of the bottom portion 521 in the first embodiment.

The second engagement support portion 542 is located on the inside of the ink-outlet forming portion 42 in the radial direction and protrudes in the +Z direction of the center axis O from the bottom portion 522 toward the ink storing chamber 39. In the present embodiment, the second engagement support portion 542 has a cylindrical shape centered on the center axis O. The second engagement support portion 542 is apart from the protruding portion 531 and surrounds at least part of the protruding portion 531 on the outside of the protruding portion 531 in the radial direction. The second engagement support portion 542 is located on the inside of the coupling portion 411 in the radial direction. In other words, the second engagement support portion 542 is apart from the inner surface 32*f* of the container body portion 32 and extends in the Z direction along the inner surface 32*f* of the container body portion 32.

The valve-side engagement portion 550 detachably engages the container body portion 32. The valve-side engagement portion 550 is a thread portion 552 formed on the outer surface 542*g* of the second engagement support portion 542 and is configured to be engaged by thread engagement. Thus, the thread portion 552 is a thread groove that engages the container-side engagement portion 352 which is a thread ridge. In other words, the thread portion 552 is an external thread portion formed by thread-cutting the outer surface 542*g* of the second engagement support portion 542. The thread portion 552 is formed in a spiral shape in the circumferential direction centered on the center axis O.

To attach the valve holder 52 to the container body portion 32, for example, the protruding portion 531 is held, and the valve holder 52 is rotated in the circumferential direction centered on the center axis O. With this operation, the thread portion 552, which is the valve-side engagement portion 550, engages the container-side engagement portion 352, and the valve holder 52 is attached to the container body portion 32. In this way, the valve holder 52 is attached to the container body portion 32.

To remove the valve holder 52 from the container body portion 32, for example, the protruding portion 531 is held, and the valve holder 52 is rotated in the circumferential direction centered on the center axis O. With this operation, the thread portion 552 and the container-side engagement portion 352 are disengaged, and the valve holder 52 is removed from the container body portion 32.

In the above second embodiment, as illustrated in FIG. 5, the container body portion 32 has the container-side engagement portion 352, and the valve holder 52 has the valve-side engagement portion 550 configured to engage the container-side engagement portion 352. With this configuration, it is possible to detachably attach the valve holder 52 to the container body portion 32. With this configuration, even though the valve holder 52 is attached to the container body portion 32, it is possible to remove the valve unit 502 from the container body portion 32 and reuse the valve unit 502.

In the above second embodiment, the valve-side engagement portion 550 is the thread portion 552 configured to come in thread engagement with the container-side engagement portion 352. With this configuration, it is possible to easily attach or detach the valve holder 52 to or from the container body portion 32 by rotating the valve holder 52.

C. Third Embodiment

Figure 6:
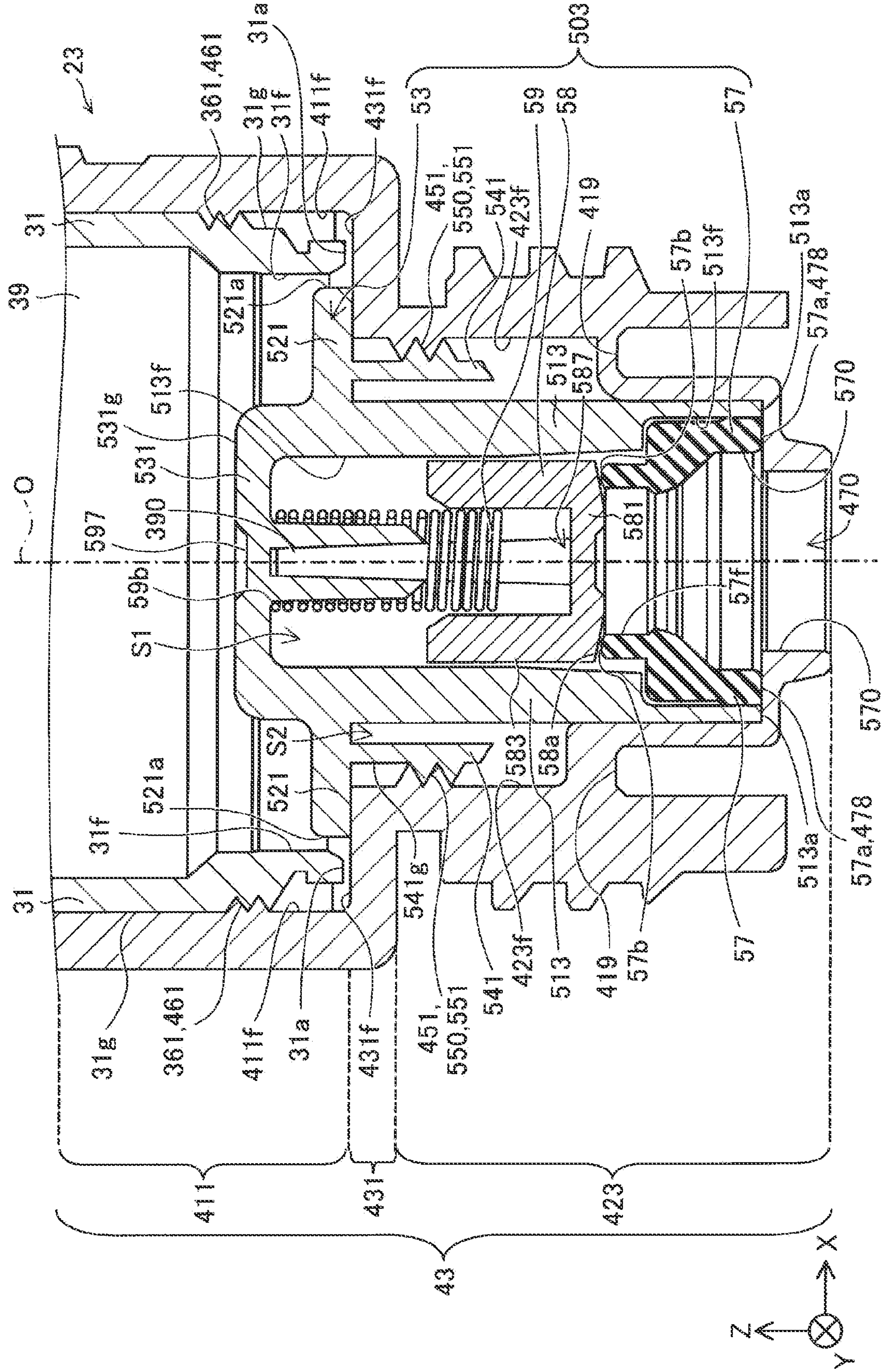
FIG. 6 is an enlarged cross-sectional view of an ink refill container of a third embodiment illustrating the schematic configuration.

FIG. 6 is an enlarged cross-sectional view of an ink refill container 23 of a third embodiment illustrating its schematic configuration. As in FIG. 4, FIG. 6 illustrates a cross-sectional view of part of the container body portion 31, an ink-outlet forming portion 43, and a valve unit 503 taken along the XZ plane including the center axis O. In the present embodiment, a valve holder 53 further holds the sealing member 57. The sealing member 57 is held by a holding portion 513 of the valve holder 53. Hence, in the present embodiment, part of the configuration of the holding portion 513 of the valve holder 53 in the valve unit 503 differs from that in the first embodiment. The other configurations are the same as those in the first embodiment illustrated in FIGS. 1 to 4. The constituents the same as those in the first embodiment are denoted by the same reference numerals, and description thereof is omitted.

The holding portion 513 is configured to hold the sealing member 57 in addition to the valve member 58 and the spring member 59. Specifically, the holding distal-end portion **513*a* is located at the seal distal-end portion 57*a* side of the sealing member 57. In other words, the length of the holding portion 513 in the present embodiment is longer than the length of the holding portion 511 in the first embodiment illustrated in FIG. 4. Here, the lengths of the holding portions 511 and 513 correspond to the dimensions in the Z direction of the center axis O. The portion of the inner surface 513*f* of the holding portion 513 on the holding distal-end portion 513*a* side, the portion being in contact with or close to the sealing member 57, has a shape conforming to the outer shape of the sealing member 57. The holding portion 513 with this configuration holds the sealing member 57, the valve member 58, and the spring member 59 so as to radially surround them. Note that a cylindrical portion 423 is formed to have a shape configured to house the holding distal-end portion 513*a***.

In the above third embodiment, as illustrated in FIG. 6, the valve holder 53 holds the sealing member 57, the valve member 58, and the spring member 59. This configuration makes it possible to move the sealing member 57, the valve member 58, the spring member 59, and the valve holder 53 together. Thus, by removing the valve holder 53 from the ink-outlet forming portion 43, it is possible to remove not only the valve member 58 and the spring member 59 but also the sealing member 57. This makes it easier to clean the valve unit 503. Thus, it is possible to reuse the valve unit 503 more easily.

In the above third embodiment, it is possible to attach the valve unit 503 into which the sealing member 57, the valve member 58, the spring member 59, and the valve holder 53 are integrated, to the ink-outlet forming portion 43. After the valve unit 503 is removed and cleaned, it is possible to attach the valve unit 503 to the ink-outlet forming portion 43 more easily.

In the above third embodiment, it is possible to attach or detach the valve unit 503 to or from the ink-outlet forming portion 43 easily. This configuration makes it possible to attach the valve unit 503 to the ink-outlet forming portion 43 easily in the production process of the ink refill container 23.

In the above third embodiment, by removing the valve holder 53 from the ink-outlet forming portion 43, it is possible to remove the valve unit 503 as a unitary structure. This configuration makes it easy to clean the container body portion 31, the ink-outlet forming portion 43, and the like. Hence, it is easy to reuse the ink refill container 23 that needs cleaning.

In the ink refill container 23 of the above third embodiment, the valve unit 503 and the constituents 31 and 43 other than the valve unit 503 can have different structures. With this configuration, for example, the valve unit 503 and the constituents 31 and 43 other than the valve unit 503 can be produced in different production locations, and then these are transported to another production location and can be integrated into the ink refill container 21. Such an operation, for example, makes selection of production locations flexible in consideration of procurement routes for production equipment and raw materials and production cost such as labor cost. In addition, since the outer shape of the valve unit 503 is smaller than the outer shape of the ink refill container 23, it is possible to save costs necessary for storage and transportation. Thus, it is possible to produce the valve unit 503 at a desired production location and at desired time, making the production more efficient.

In the ink refill container 23 in the above third embodiment, the valve unit 503 and the constituents 31 and 43 other than the valve unit 503 can have different structures. With this configuration, when the valve unit 503 is removed and reused, it is possible to make the supply more stable.

D. Fourth Embodiment

Figure 7:
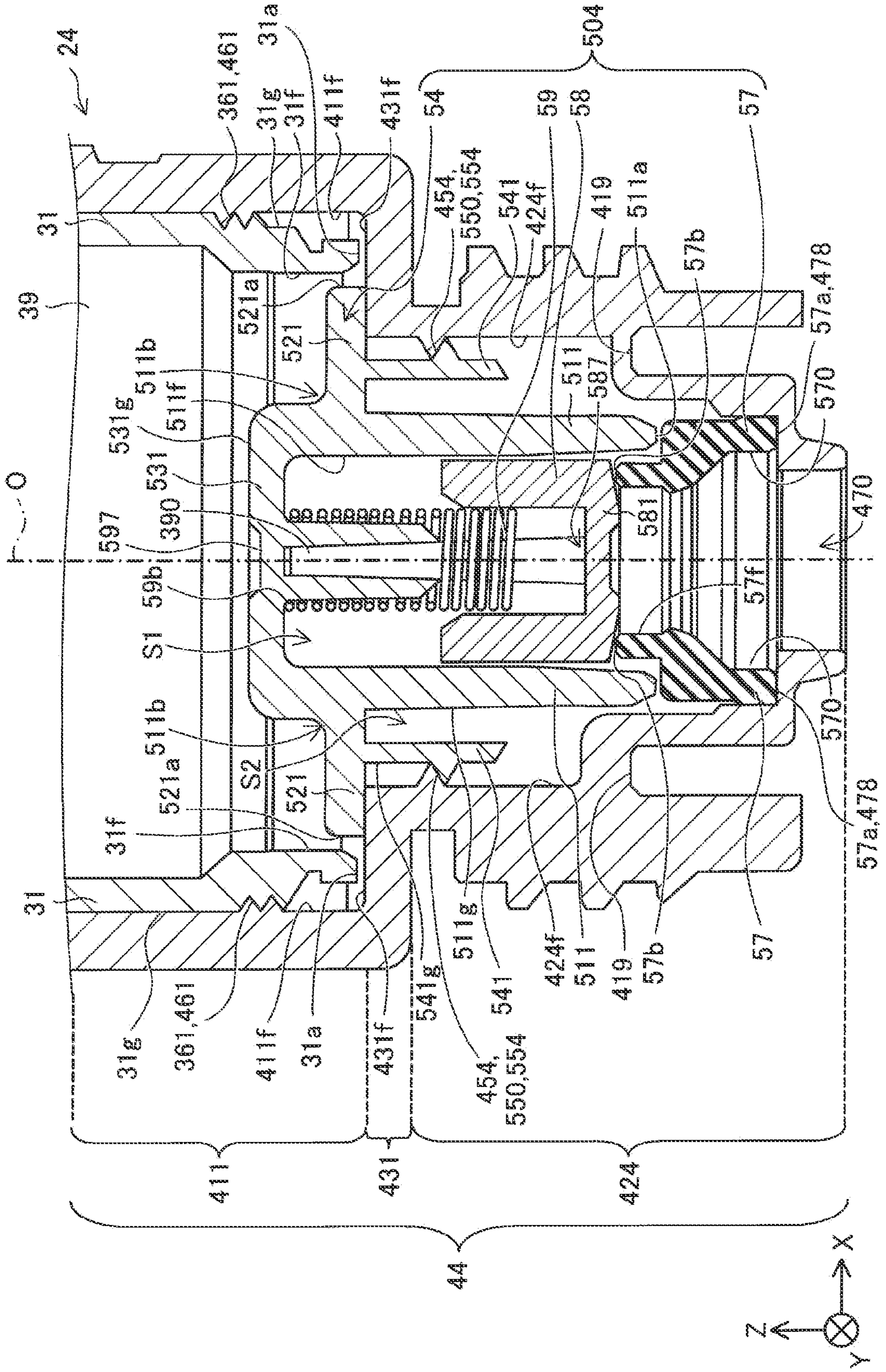
FIG. 7 is an enlarged cross-sectional view of an ink refill container of a fourth embodiment illustrating the schematic configuration.

FIG. 7 is an enlarged cross-sectional view of an ink refill container 24 of a fourth embodiment illustrating its schematic configuration. As in FIG. 4, FIG. 7 illustrates a cross-sectional view of part of the container body portion 31, an ink-outlet forming portion 44, and a valve unit 504 taken along the XZ plane including the center axis O. In the present embodiment, the method of engaging a valve holder 54 with the ink refill container 24 differs from that in the first embodiment. Specifically, a valve-side engagement portion 550 is a pressure-contact portion 554 configured to be in pressure contact and engaged with the ink-outlet forming portion 44. With this, the configurations of a container-side engagement portion 454 of the ink-outlet forming portion 44 and the valve-side engagement portion 550 of the valve holder 54 differ from those in the first embodiment. The other configurations are the same as those in the first embodiment illustrated in FIGS. 1 to 4. The constituents the same as those in the first embodiment are denoted by the same reference numerals, and description thereof is omitted.

The container-side engagement portion 454 is formed on the inner surface 424*f* of a cylindrical portion 424 at a position closer to the ink storing chamber 39 of the container body portion 31 than the position at which the container-side positioning portion 419 is formed. The container-side engagement portion 454 is a protrusion protruding from the inner surface 424*f* of the cylindrical portion 421 toward the center axis O. The container-side engagement portion 454 is formed in the circumferential direction centered on the center axis O to be parallel to the XY plane orthogonal to the Z direction of the center axis O.

The pressure-contact portion 554 is a protrusion protruding from the outer surface 541*g* of the first engagement support portion 541 in the direction opposite to the direction toward the center axis O. The pressure-contact portion 554 is formed in the circumferential direction centered on the center axis O to be parallel to the XY plane orthogonal to the Z direction of the center axis O.

To attach the valve holder 54 to the ink-outlet forming portion 44, for example, the ink-outlet forming portion 44 is fixed, and the valve holder 54 is pushed in from the coupling portion 411 side in the −Z direction. With this operation, the pressure-contact portion 554 is in pressure contact and engaged with the container-side engagement portion 454. Thus, the valve holder 54 is detachably attached to the ink-outlet forming portion 44.

To remove the valve holder 54 from the ink-outlet forming portion 44, for example, the ink-outlet forming portion 44 is fixed, and a jig is inserted from the ink outlet 470 side to push out the valve holder 54 in the +Z direction. Alternatively, the protruding portion 531 is held and pulled out in the +Z direction. With this operation, the pressure-contact portion 554 and the container-side engagement portion 454 are disengaged, and the valve holder 54 is removed from the ink-outlet forming portion 44.

In the above fourth embodiment, as illustrated in FIG. 7, the valve-side engagement portion 550 is the pressure-contact portion 554 configured to be in pressure contact and engaged with the container-side engagement portion 454 of the ink-outlet forming portion 44. With this configuration, it is possible to detachably attach the valve holder 54 to the ink-outlet forming portion 44 by bringing the pressure-contact portion 554 which is the valve-side engagement portion 550 into pressure contact with the container-side engagement portion 454.

In the above fourth embodiment, it is possible to engage the container-side engagement portion 454 and the pressure-contact portion 554 by pressure contact and release the engagement. Hence, in the production process of the ink refill container 24, this configuration makes it possible to assemble the valve holder 54 to the ink-outlet forming portion 44 more easily than when the valve-side engagement portion 550 is the thread portion 551 illustrated in FIG. 4.

E. Fifth Embodiment

Figure 8:
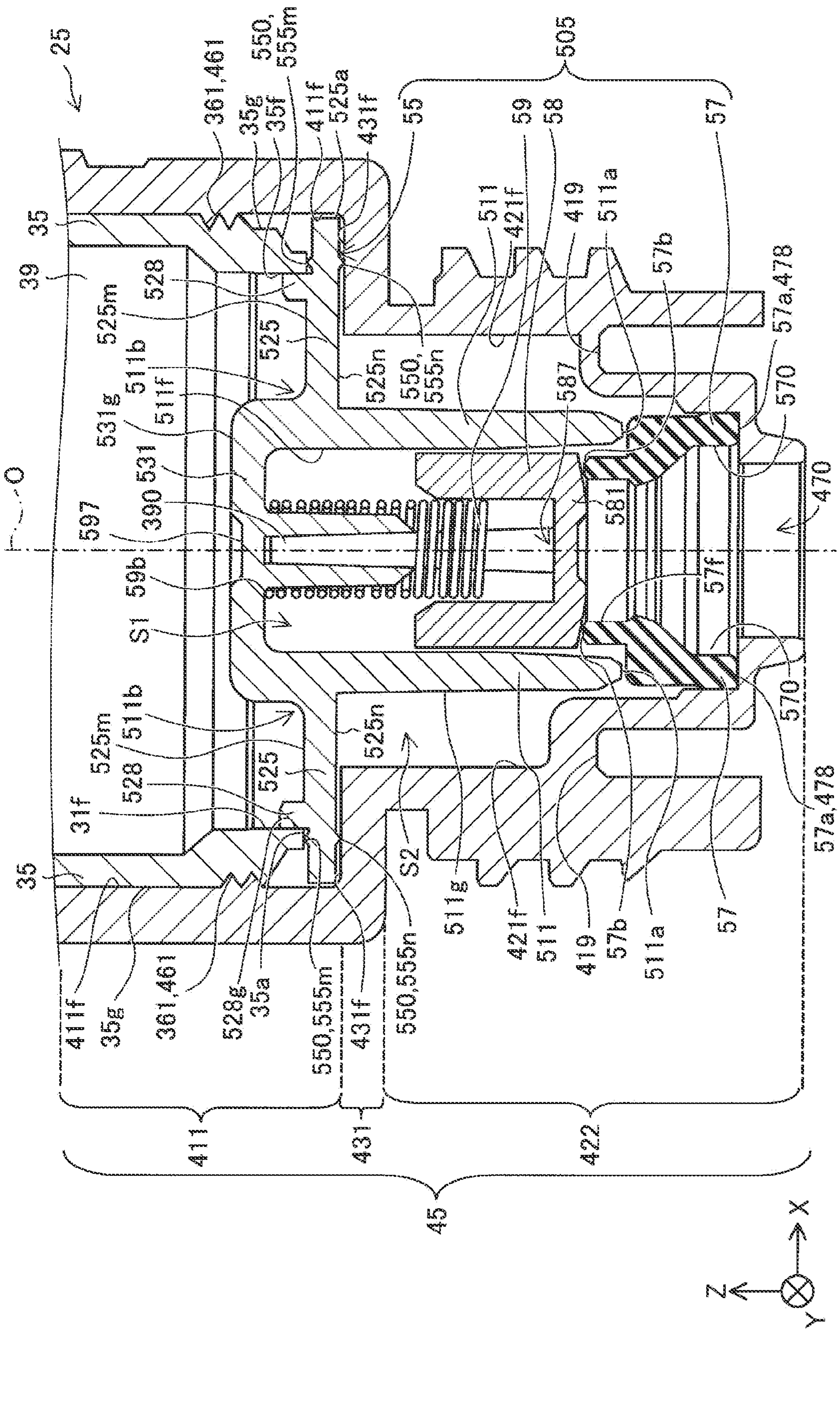
FIG. 8 is an enlarged cross-sectional view of an ink refill container of a fifth embodiment illustrating the schematic configuration.

FIG. 8 is an enlarged view of an ink refill container 25 of a fifth embodiment illustrating its schematic configuration. As in FIG. 4, FIG. 8 illustrates a cross-sectional view of part of a container body portion 35, an ink-outlet forming portion 45, and a valve unit 505 taken along the XZ plane including the center axis O. In the present embodiment, the position at which a valve holder 55 is engaged with the ink refill container 25 and the engagement method differ from those in the first embodiment. Specifically, the valve holder 55 is in close contact with and nipped between the container distal-end portion 35*a* of the container body portion 35 and the inner surface 431*f* of the step portion 431 of the ink-outlet forming portion 45, and the valve holder 55 is thus engaged with the ink refill container 25. Hence, part of the configuration of the container body portion 35 and the configuration of the valve-side engagement portion 550 differ from those in the first embodiment. The other configurations are the same as those in the first embodiment illustrated in FIGS. 1 to 4. The constituents the same as those in the first embodiment are denoted by the same reference numerals, and description thereof is omitted.

The container distal-end portion 35*a* of the container body portion 35 is located in the +Z direction relative to that in the first embodiment illustrated in FIG. 4 so that the container distal-end portion 35*a* can nip a first nipped portion 555*m* of the valve-side engagement portion 550 on the side facing the ink storing chamber 39 of the container body portion 35. In other words, the length of the container body portion 35 in the present embodiment is shorter than the length of the container body portion 31 in the first embodiment. Here, the lengths of the container body portions 31 and 35 correspond to the dimensions in the Z direction of the center axis O.

The valve holder 55 includes a protruding portion 531, a holding portion 511, a bottom portion 525, the first nipped portion 555*m* and a second nipped portion 555*n* which serve as the valve-side engagement portion 550, and a lock portion 528. In other words, in the present embodiment, the valve holder 55 does not have the engagement support portion 541 or 542. The configurations of the protruding portion 531 and the holding portion 511 are the same as those in the first embodiment illustrated in FIG. 4.

The bottom portion 525 has an annulus shape formed in the circumferential direction centered on the center axis O as in the first embodiment. The bottom-portion distal-end portion 525*a* of the bottom portion 525 is located further outside in the radial direction, compared with the bottom-portion distal-end portion 521*a* of the bottom portion 521 in the first embodiment illustrated in FIG. 4 so that the first nipped portion 555*m*, the second nipped portion 555*n*, and the lock portion 528 can be formed. In other words, the outer diameter of the bottom portion 525 in the present embodiment is larger than the outer diameter of the bottom portion 521 in the first embodiment. The bottom-portion distal-end portion 525*a* faces a portion of the inner surface 411*f* of the coupling portion 411 close to the step portion 431.

The first nipped portion 555*m* is a protrusion protruding toward the ink storing chamber 39 from a first face 525*m* of the bottom portion 525 of the valve holder 55 on the side facing the ink storing chamber 39 of the container body portion 35. The distal end of the first nipped portion 555*m* is in contact with the container distal-end portion 35*a* of the container body portion 35. The first nipped portion 555*m* is formed in the circumferential direction centered on the center axis O.

The second nipped portion 555*n* is a protrusion protruding toward the step portion 431 from a second face 525*n* of the bottom portion 525 of the valve holder 55 on the step portion 431 side. The distal end of the second nipped portion 555*n* is in contact with the inner surface 431*f* of the step portion 431. The second nipped portion 555*n* is formed in the circumferential direction centered on the center axis O.

The lock portion 528 restricts the position of the valve holder 55 so that the valve holder 55 can easily be positioned relative to the container body portion 35 and the ink-outlet forming portion 45, and that the first nipped portion 555*m* and the second nipped portion 555*n* can be placed at appropriate positions. Here, "appropriate positions" denotes positions at which the distal end portion of the first nipped portion 555*m* comes into contact with the container distal-end portion 35*a* of the container body portion 31 and at which the distal end portion of the second nipped portion 555*n* comes into contact with the inner surface 431*f* of the step portion 431. The lock portion 528 is a protrusion protruding from the first face 525*m* of the bottom portion 525 of the valve holder 55 toward the ink storing chamber 39. The lock portion 528 is formed at a position on the inside of the first nipped portion 555*m* in the radial direction and adjacent to the first nipped portion 555*m*. The outer surface 528*g* of the lock portion 528 is in contact with a portion of the inner surface 35*f* of the container body portion 35 close to the container distal-end portion 35*a*. The lock portion 528 is formed in the circumferential direction centered on the center axis O and extends in the Z direction along the inner surface 35*f* of the container body portion 35. Note that the shape of the lock portion 528 is not limited to this configuration. The lock portion 528 may be composed of, for example, a plurality of portions intermittently formed in at least part of the circumferential direction centered on the center axis O. Note that the lock portion 528 is not an essential constituent in the valve holder 55.

In the above fifth embodiment, as illustrated in FIG. 8, the valve holder 55 can be detachably attached to the ink refill container 25 by making the valve-side engagement portion 550 in close contact with and nipped between the container distal-end portion 35*a* and the inner surface 431*f* of the step portion 431. With this configuration, it is possible to remove the valve holder 55 easily by removing the container body portion 35 from the ink-outlet forming portion 45.

In the above fifth embodiment, the valve holder 55 includes the lock portion 528 formed at a position adjacent to the first nipped portion 555*m* and is configured to come into contact with the inner surface 35*f* of the container body portion 35. This configuration makes it easy to position the first nipped portion 555*m* and the second nipped portion 555*n* when the first nipped portion 555*m* and the second nipped portion 555*n* are nipped by the container distal-end portion 35*a* of the container body portion 35 and the inner surface 431*f* of the step portion 431.

In the above fifth embodiment, the lock portion 528 restricts the position of the valve holder 55. This configuration enables the first nipped portion 555*m* and the second nipped portion 555*n* to be placed at appropriate positions.

F. Other Embodiments

F-1: Another Embodiment 1

In the above fourth embodiment, as illustrated in FIG. 7, the pressure-contact portion 554 which is the valve-side engagement portion 550 is formed on the outer surface 541*g* of the first engagement support portion 541 protruding from the bottom portion 521 of the valve holder 54 toward the ink outlet 470. However, the present disclosure is not limited to this configuration. The pressure-contact portion 554 may be formed on the outer surface 542*g* of the second engagement support portion 542 illustrated in FIG. 5. When the pressure-contact portion 554 is on the outer surface 542*g* of the second engagement support portion 542, the container-side engagement portion 454 is formed at a position on the inner surface 31*f* of the container body portion 31 where the container-side engagement portion 454 can be engaged with the pressure-contact portion 554. This configuration makes it possible to detachably attach the valve holder 54 to the container body portion 31.

F-2: Another Embodiment 2

In the above fourth embodiment, as illustrated in FIG. 7, the pressure-contact portion 554 is formed in the circumferential direction centered on the center axis O. However, the present disclosure is not limited to this configuration. The pressure-contact portion 554 may be composed of, for example, a plurality of portions intermittently formed on the outer surface 541*g* or 542*g* of the engagement support portion 541 or 542 in at least part of the circumferential direction centered on the center axis O. In this case, the container-side engagement portion 454 is formed on either the inner surface 424*f* of the cylindrical portion 424 of the ink-outlet forming portion 44 or the inner surface 31*f* of the container body portion 31 at a position where the container-side engagement portion 454 can be engaged with the pressure-contact portion 554. This configuration also makes it possible to detachably attach the valve holder 54 to either the ink-outlet forming portion 44 or the container body portion 31.

G. Other Configurations

The present disclosure is not limited to the foregoing embodiments and can be implemented with various configurations within a scope not departing from the spirit. For example, the technical features of the embodiments corresponding to the technical features of the configurations written in the summary of the disclosure can be replaced or combined as appropriate to solve some or all of the foregoing problems or to achieve some or all of the foregoing effects. Unless technical features are explained in the present specification as essential ones, they can be omitted as appropriate.

(1) An aspect of the present disclosure provides an ink refill container. An ink refill container for refilling an ink tank of a printer with ink through an ink introduction conduit communicating with the ink tank, includes: a container body portion having an ink storing chamber configured to store ink; an ink-outlet forming portion coupled to the container body portion and including a cylindrical portion having an ink outlet; a sealing member disposed in the cylindrical portion and having an opening that enables insertion and removal of the ink introduction conduit; a valve member provided to be configured to come into contact with the sealing member; a spring member configured to urge the valve member toward the sealing member; and a valve holder configured to hold at least the valve member and the spring member, and the valve holder includes an engagement portion configured to detachably engage at least one of the ink-outlet forming portion and the container body portion at a position closer to the ink storing chamber than the attachment position of the sealing member in a direction of a center axis of the ink outlet. In this configuration, the valve holder configured to hold the valve member and the spring member includes an engagement portion configured to detachably engage at least one of the ink-outlet forming portion and the container body portion. With this configuration, it is possible to detachably attach the valve holder to at least one of the ink-outlet forming portion and the container body portion. With this configuration, it is possible to easily remove the valve holder which is attached to at least one of the ink-outlet forming portion and the container body portion. Thus, by removing the valve holder, the valve member, and the spring member from the ink refill container and cleaning them, it is possible to reuse the valve holder, the valve member, and the spring member. chamberconduit Further, since the valve holder, the valve member, and the spring member can be removed from the ink refill container, and the ink refill container can be cleaned, it is easy to reuse the ink refill container that needs cleaning.

(2) In the above configuration, the engagement portion is located between the sealing member and the ink storing chamber along a center axis of the ink outlet. In this configuration, since the engagement portion of the valve holder is located at a position closer to the ink storing chamber than the attachment position of the sealing member, and thus, the engagement portion of the valve holder is not in regions on the outside of the sealing member in the radial direction, it is easy to increase the diameter of the opening of the sealing member. The larger diameter the opening of the sealing member has, the larger diameter the ink introduction conduit can have. This makes it possible to increase the flow rate of ink and to shorten the time to require ink refilling.

(3) In the above configuration, the valve holder may further hold the sealing member. In this configuration, the valve holder is configured to hold the sealing member, the valve member, and the spring member. With this configuration, by removing or attaching the valve holder from or to at least one of the ink-outlet forming portion and the container body portion, it is possible to move the sealing member, the valve member, and the spring member together. This configuration makes it even easier to clean the valve mechanism including the sealing member, the valve member, the spring member, and the valve holder. Thus, this in turn makes it possible to reuse the valve mechanism more easily. After the valve holder, the sealing member, the valve member, and the spring member are removed from the ink refill container, the ink refill container can be cleaned, and this makes it even easier to reuse the ink refill container that needs cleaning.

(4) In the above configuration, the engagement portion may be a thread portion configured to be engaged by thread engagement. In this configuration, the engagement portion is a thread portion configured to be engaged with at least one of the ink-outlet forming portion and the container body portion by thread engagement. With this configuration, by rotating the valve holder, it is possible to easily attach or detach the valve holder and the valve member and spring member held by the valve holder to or from at least one of the ink-outlet forming portion and the container body portion.

(5) In the above configuration, the engagement portion may be a pressure-contact portion configured to be in pressure contact and engaged with at least one of the ink-outlet forming portion and the container body portion. In this configuration, the valve holder can be engaged with at least one of the ink-outlet forming portion and the container body portion by pressure contact. This configuration makes it easy to assemble the valve holder to at least one of the ink-outlet forming portion and the container body portion.

(6) In the above configuration, the valve holder may further include a protruding portion located on the side opposite from the side configured to hold the spring member and protruding in a center axis direction directed from the ink outlet side toward the ink storing chamber side. In this configuration, the valve holder includes the protruding portion. With this configuration, by holding the protruding portion, it is possible to easily engage or disengage the valve holder with or from at least one of the ink-outlet forming portion and the container body portion.

(7) In the above configuration, the ink-outlet forming portion may further include a step portion at a position closer to the coupling portion coupled to the container body portion than the ink outlet in a direction of a center axis, and the engagement portion may be in contact with and nipped between a distal end portion of the container body portion and an inner surface of the step portion. In this configuration, by making the engagement portion in contact with and nipped between the distal end portion of the container body portion and the inner surface of the step portion, it is possible to detachably attach the valve holder to at least one of the ink-outlet forming portion and the container body portion. With this configuration, by removing the ink-outlet forming portion from the container body portion, it is possible to easily remove the valve holder from the ink refill container.

(8) In the above configuration, the ink-outlet forming portion and the container body portion may further include respective coupling portions configured to be coupled by thread engagement. In this configuration, the ink-outlet forming portion and the container body portion are coupled by thread engagement. With this configuration, it is possible to couple the ink-outlet forming portion and the container body portion without welding the ink-outlet forming portion to the container body portion. This makes it possible to easily remove the ink-outlet forming portion from the container body portion.

All of the plurality of constituents included in the foregoing configurations in the present disclosure are not essential. To solve some or all of the foregoing problems or to achieve some or all of the effects described in the present specification, some constituents of the plurality of constituents may be changed, eliminated, or replaced with other new constituents, or some restrictions applied to some of the constituents may be eliminated, as appropriate. In addition, to solve some or all of the foregoing problems or to achieve some or all of the effects described in the present specification, some or all of the technical features included in a foregoing configuration of the present disclosure may be combined with some or all of the technical features included in another foregoing configuration of the present disclosure to make an independent configuration of the present disclosure.

The present disclosure may be implemented in various configurations other than ink refill containers. For example, the present disclosure may be implemented as aspects such as a method of producing ink refill containers.

What is claimed is:

1. An ink refill container for refilling an ink tank of a printer with ink through an ink introduction conduit communicating with the ink tank, the ink refill container comprising:

a container body portion having an ink storing chamber configured to store ink;

an ink-outlet forming portion coupled to the container body portion and including a cylindrical portion having an ink outlet;

a sealing member disposed in the cylindrical portion and having an opening that enables insertion and removal of the ink introduction conduit;

a valve member provided to be configured to come into contact with the sealing member;

a spring member configured to urge the valve member toward the sealing member; and a valve holder configured to hold at least the valve member and the spring member, wherein the valve holder includes an engagement portion configured to detachably engage the ink-outlet forming portion.

2. The ink refill container according to claim 1, wherein the engagement portion is located between the sealing member and the ink storing chamber along a center axis of the ink outlet.

3. The ink refill container according to claim 1, wherein the valve holder is configured to further hold the sealing member.

4. The ink refill container according to claim 1, wherein the engagement portion is a thread portion configured to be engaged by thread engagement.

5. The ink refill container according to claim 1, wherein the engagement portion is a pressure-contact portion configured to be in pressure contact and engaged with at least one of the ink-outlet forming portion and the container body portion.

6. The ink refill container according to claim 1, wherein the valve holder further includes a protruding portion protruding in a center axis direction directed from the ink outlet side toward the ink storing chamber side.

7. The ink refill container according to claim 1, wherein the ink-outlet forming portion further includes a step portion between the ink outlet and a coupling portion coupled to the container body portion in a direction of a center axis, and the engagement portion is in contact with and nipped between a distal end portion of the container body portion and an inner surface of the step portion.

8. The ink refill container according to claim 1, wherein the ink-outlet forming portion and the container body portion further include respective coupling portions configured to be coupled by thread engagement.

9. The ink refill container according to claim 1, wherein the valve member and the spring member are integrated with the valve holder to form a structure that is detachably attachable to the ink-outlet forming portion.

10. The ink refill container according to claim 1, wherein the valve member, the spring member, and the sealing member are integrated with the valve holder to form a structure that is detachably attachable to the ink-outlet forming portion.

* * * * *